No. 12,352. REISSUED MAY 30, 1905.
J. T. COLE.
WATER COOLER EQUIPMENT.
APPLICATION FILED MAR. 24, 1905.
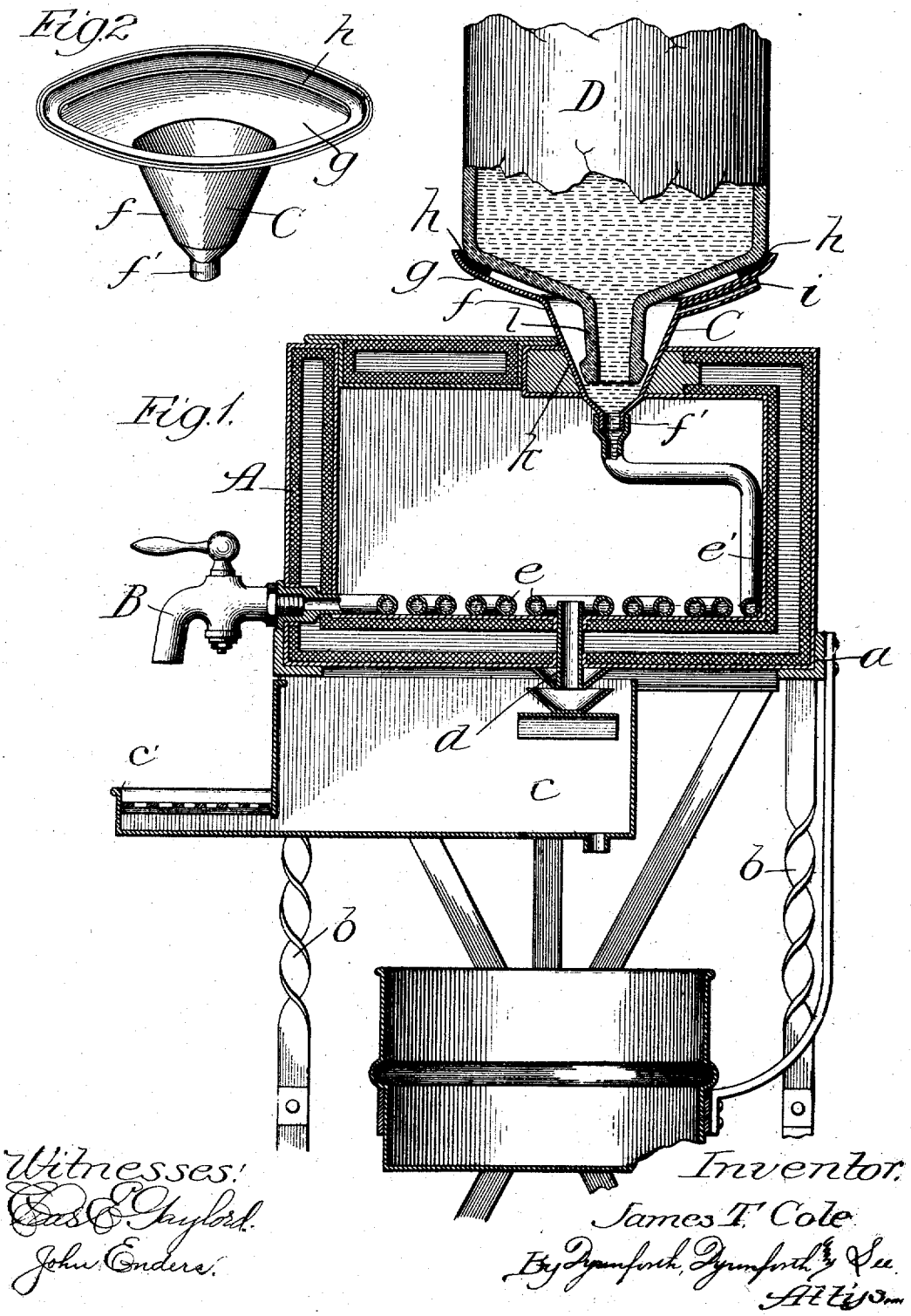
Witnesses:
Chas. E. Taylor.
John Enders.
Inventor.
James T. Cole.
By Dyrenforth, Dyrenforth & Lee.
Attys.

No. 12,352. Reissued May 30, 1905.

UNITED STATES PATENT OFFICE.

JAMES T. COLE, OF CHICAGO, ILLINOIS.

WATER-COOLER EQUIPMENT.

SPECIFICATION forming part of Reissued Letters Patent No. 12,352, dated May 30, 1905.

Original No. 745,571, dated December 1, 1903. Application for reissue filed March 24, 1905. Serial No. 251,892.

*To all whom it may concern:*

Be it known that I, JAMES T. COLE, a citizen of the United States, residing at Chicago, in the county of Cook and State of Illinois, have invented a new and useful Improvement in Water-Cooler Equipments, of which the following is a specification.

My invention relates to an improvement in the class of appurtenances commonly known as "water-coolers" which are provided as their more common use in offices and households and in public places for supplying drinking-water furnished from time to time as the supply requires replenishment by dealers in such water. It is a common practice of such dealers to distribute the drinking-water to their customers in portable holders, such as sheet-metal cans and glass bottles, each containing a predetermined quantity, (usually a number of gallons,) and means have been provided for adapting the holder to be used in connection with a cooler by supporting it therein in inverted position with its neck opening into a pipe-coil to discharge into the latter, wherein the water is cooled by ice in the cooler-chamber and from which it is drawn off for drinking.

The primary object of my invention is to provide a novel, very simple, and substantial construction of holder-supporting equipment for such a water-cooler which shall have a closed connection with a pipe-coil or other form of conduit in the cooler, and thus serve to protect the water in passing from the holder into the conduit against access to it of air in the tank, which is rendered more or less foul by the ice contained in the cooler and from other causes and would tend to contaminate the drinking-water, the construction adapting the holder containing the supply of drinking-water to be readily seated at its neck on the cooler into communication with the pipe-coil therein by merely placing it on the cooler in inverted position and without requiring for sustaining the holder in its position or to prepare it for use that it or that any mechanism for the purpose be manipulated.

In the accompanying drawings, Figure 1 is a broken view, in vertical sectional elevation, of a water-cooler provided with my improved holder-supporting equipment and showing a water-bottle in place thereon; and Fig. 2, a perspective view of the holder-support.

The water-cooler may involve any known or suitable general construction. That represented in the drawings comprises a cooler-tank A, resting on a bed *a*, supported on braced legs *b*, with a withdrawable and replaceable waste-water receptacle *c* on the base of the tank, having a drinking-glass support *c'* extending from it, and into which the tank discharges through a sealed drip-pipe *d*. In the tank A is contained a pipe-coil *e*, leading to a draw-off faucet B.

C is the holder-support, comprising, essentially, a neck *f*, provided about its outer end with an expanded rim *g*, forming a seat for the shoulder portion of a bottle D or other water-holder. The preferred construction of the support C is that illustrated, in which the shoulder-seat is dished and provided about its inner surface near its edge with a gasket *h* and at any suitable point on its under side with a vent-tube *i*, opening into the neck portion *f*, and the neck is contracted or formed tapering toward its open seating end, where it terminates in a nipple *f''*. The support C is seated at its neck *f* in an opening *k*, formed through the top wall of the tank A, in which the support is stably retained, and at the nipple *f''* closed connection is made with the end of the rising leg *e'* of the coil *e*.

To adjust a holder D full of water on the cooler, the seal is first removed, (as the cork from its neck,) when the holder is tipped into the support C to cause its neck *l* to enter the neck *f* of the support and the shoulder portion of the holder to rest on the shoulder-seat *g* of the support against the gasket *h*, whereby the junction is rendered air-tight to exclude dust and other foreign matter that would tend to contaminate the water. In tipping the holder to thus adjust it some of its contents flow into the coil, rising therein and in the neck *f*, as indicated, to a level to or below which the mouth of the holder-neck *l* reaches. Thereafter the space about the holder-neck being vented through the tube *i*, which may be provided with a vent-cock (not shown) to exclude dust and the like, though such provision is not necessary, whenever the cock B is opened water will flow, being drawn directly from the holder D through the coil, in which it may be cooled by a supply of ice (not shown) in the tank.

It is found in practice, particularly when the shoulder-seat *g* is unprovided with a gasket, that a special vent on the support C may be dispensed with.

What I claim as new, and desire to secure by Letters Patent, is—

1. In combination with a water-cooler, a support for a water-holder in inverted position, comprising a neck having closed communication in the cooler-tank with a conduit therein and a seat about the outer end of said neck, and a water-holder in inverted position on said support with its neck within the neck of the support and its shoulder engaging said seat.

2. In combination with a water-cooler, a support for a water-holder in inverted position, comprising a neck having closed communication in the cooler-tank with a conduit therein and an expanded rim about the outer end of said neck, and a water-holder in inverted position on said support with its neck within the neck of the support.

3. In combination with a water-cooler, a support for a water-holder in inverted position, comprising a neck communicating with a pipe-coil in the cooler-tank and an expanded rim about the outer end of said neck, and a water-holder in inverted position on said support with its neck within the neck of the support and its shoulder seating upon the rim thereof.

4. In combination with a water-cooler, a support for a water-holder in inverted position, comprising a neck communicating with a pipe-coil in the cooler-tank and a gasket-equipped expanded rim about the outer end of said neck, and a water-holder in inverted position on said support with its neck within the neck of the support and its shoulder seated upon the rim thereof.

5. In combination with a water-cooler, a support for a water-holder in inverted position, comprising a tapering vented neck portion seated on the cooler-tank to open into the pipe-coil therein, and a dished seat for the shoulder of said holder about the outer end of the support-neck.

6. In combination with a water-cooler, a support for a water-holder in inverted position, comprising a tapering vented neck portion seated on the cooler-tank to open into the pipe-coil therein, a vent-tube opening into said neck, and a dished gasket-equipped seat for the shoulder of said holder about the outer end of the support-neck.

JAMES T. COLE.

In presence of—
J. H. LANDES,
L. HEISLAR.